United States Patent [19]
Komedera

[11] 3,898,856
[45] Aug. 12, 1975

[54] WATER CHILLING METHOD AND APPARATUS

[75] Inventor: Mieczyslaw Komedera, Orpington, England

[73] Assignee: MK Refrigeration Ltd., Kent, England

[22] Filed: Sept. 24, 1973

[21] Appl. No.: 400,118

[30] Foreign Application Priority Data
Oct. 6, 1972 United Kingdom............... 46352/72

[52] U.S. Cl. .......................... 62/98; 62/139; 62/399
[51] Int. Cl. .............................................. B67d 5/62
[58] Field of Search ................ 62/98, 139, 394, 399

[56] References Cited
UNITED STATES PATENTS

| | | | |
|---|---|---|---|
| 2,496,466 | 2/1950 | Graham | 62/394 |
| 2,720,085 | 10/1955 | Boyle | 62/139 |
| 3,496,733 | 2/1970 | Parker | 62/139 |

*Primary Examiner*—William E. Wayner
*Attorney, Agent, or Firm*—Wenderoth, Lind & Ponack

[57] ABSTRACT

For chilling a flow of water a chilling apparatus is provided comprising a water tank in which is disposed the evaporator tube of a refrigerating unit. The tube is in the form of a helix so that water freezes on the tube and bridges the spaces between adjacent coils to form a tube of ice. Water is directed through this tube from the inlet of the tank and the chilled water emerging from the other end of the ice tube is tapped off for use. The cooling efficiency can be improved by placing a helically formed guide element or a series of helically inclined vanes within the evaporating tube helix to guide the water in a helical path. A sensor is conveniently provided within the tube of ice to switch the refrigerating unit on when the sensor detects a rise in temperature resulting from melting of the ice tube and to switch the unit off when the sensor is contacted by the ice growing in the tube.

7 Claims, 4 Drawing Figures

PATENTED AUG 12 1975
3,898,856
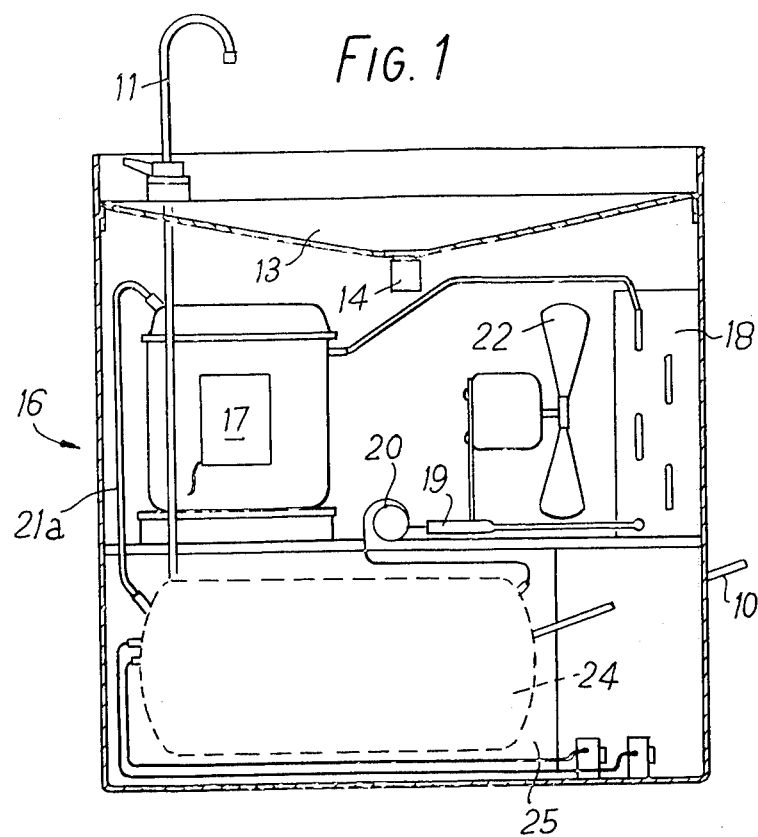
FIG. 1
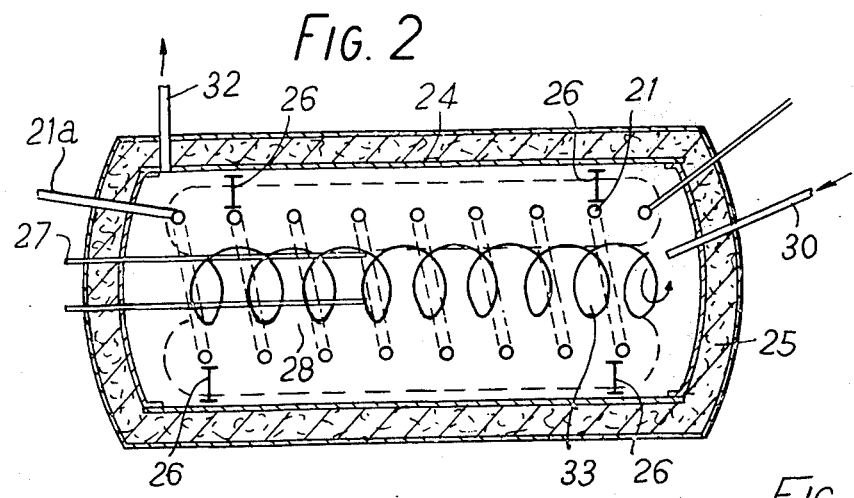
FIG. 2
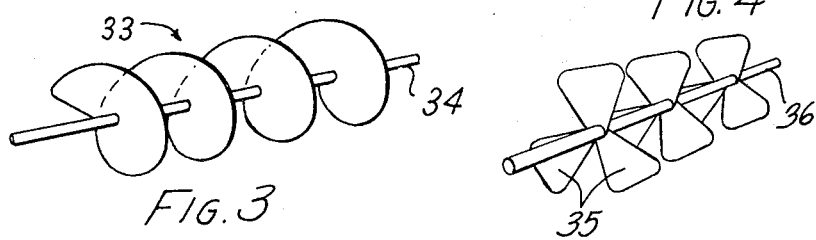
FIG. 3
FIG. 4

WATER CHILLING METHOD AND APPARATUS

This invention relates to the chilling of a flow of water.

According to the invention there is provided chilling apparatus for chilling a flow of water comprising a tank for containing water, means for forming within the tank a tube of ice, and means for directing said flow of water in a helical path through the tube of ice and in contact with the ice thereby to chill the water.

According to a preferred feature of the invention the means for directing the flow of water in a helical path through the tube of ice comprises a nozzle disposed at one end of the tube of ice which nozzle is offset from the lengthwise axis of the tube of ice and faces into the tube in a direction skewed with respect to the lengthwise axis of the tube.

According to another preferred feature of the invention the means for directing the flow of water in a helical path through the tube of ice comprises a series of helically inclined vanes or a helically formed guide element disposed coaxially within the tube.

The means for forming the tube of ice may conveniently comprise an evaporator tube of a refrigerating unit which tube is arranged in the form of a helix.

The invention also provides a method of chilling a flow of water comprising directing the flow of water into a closed tank in a helical path through a tubular bank of ice formed on a helical evaporator tube of a refrigeration unit which tube is disposed within the tank, the tank having an outlet for the chilled water.

One embodiment of the invention will now be described with reference to the accompanying diagrammatic drawings in which:

FIG. 1 shows the general arrangement of one embodiment of the invention,

FIG. 2 is a sectional view of the chilling tank or cylinder of FIG. 1,

FIG. 3 shows one form of guide element for the water flow through the cylinder, and FIG. 4 shows an alternative form of guide element.

Referring to FIG. 1 of the drawings, chilling apparatus for supplying a flow of chilled water on demand is connected to a water supply pipe 10 and has an outflow tap 11 which is disposed over a basin 13 having a waste outlet 14. Mounted below the basin in the frame of the apparatus is a refrigeration unit 16 comprising a compressor 17, condenser 18, drier 19, capillary restrictor 20, and an evaporator tube (not visible) within a closed cylinder 24, together with a motor driven fan 22 for the condenser.

The evaporator tube 21 is disposed within the closed cylinder 24 (see FIG. 2), which may have a diameter of 5 inches and which has an external insulating jacket 25. Within the cylinder the evaporator tube 21 extends in the form of a helix, the outlet end 21a of the tube communicates with the compressor 17. The evaporator tube is spaced away from the cylinder wall by spacers 26. Two sensor tubes 27 and 28 project axially into the cylinder from the downstream end thereof and control an on/off switch for the refrigeration unit. Sensor tube 27 is offset from the axis of the coil by a predetermined distance and sensor tube 28 is offset from said axis by a lesser predetermined distance. The water supply pipe 10 is connected to an inlet pipe 30 which projects through the end wall of the cylinder and which forms a nozzle directing the water flow through the middle of the coil 21. The nozzle end portion of pipe 30 is however skewed with respect to, and offset from, the axis of the coil. A water outlet pipe 32 leads from the other end of the cylinder to the outflow tap 11.

A worm-like helical guide 33, a fragment of which is shown in FIG. 3, may be supported on a rod 34 coaxially within the evaporator tube. Alternatively a plurality of helically inclined vanes can be positioned within the helix defined by the helical tube 21. In an alternative arrangement illustrated in FIG. 4, the guide is formed by helical vanes 35 supported on a rod 36.

In the operation of the apparatus the water surrounding the helical evaporator coil freezes and forms a tube of ice. When the ice grows to such an extent that the ice touches the sensor tube 27, a phial within the tube causes switching off of the refrigeration unit. When water is drawn off at the outflow tap 11, water enters the cylinder through the inlet pipe 30 and follows a helical path through the middle of the tube of ice, so as to be chilled by the ice, and flows to the outlet pipe 32.

When a certain amount of the ice has been used up, the sensor tube 27 will no longer be in contact with the ice and its temperature will therefore rise above freezing point. The phial within the tube then operates the switch of the refrigeration unit to re-start the formation of ice.

The sensor tube 28 operates in the same way as sensor tube 27 and, in the event of failure of the sensor tube 27, prevents the ice from growing to such an extent that it might cause the cylinder 24 to burst.

The use of the helical guide element 33 improves the chilling effect by increasing the effective length of the path of contact between the water and the ice.

The illustrated arrangement has a substantial advantage over a system in which the water is passed through a storage tank which is chilled. Such a storage tank must contain a large amount of water and is therefore bulky. If such a tank has a capacity of 4 gallons, and the water is chilled from 80° F to 40° F, the maximum "cold" energy available is the multiple of the weight and the temperature drop, i.e. $4 \times 10 \times (80 - 40) = 1,600$ BTUs. On the other hand a cylinder of capacity 1 gallon in the illustrated arrangement could be arranged to store say 8 lb ice, having a latent heat of 144 BTU/lb plus the sensible heat i.e. $1152 +$ approximately $1 \times 10 \times (80 - 40) =$ approximately 1,552 BTU. The cold energy of such a cylinder is therefore almost the same as that of the 4 gallon tank. The capacity of the cylinder in the preseent arrangement can therefore be a quarter of that of a chiller tank.

Other advantages of the illustrated arrangement are that the refrigeration unit can operate during the night to accumulate ice, thus allowing a smaller capacity refrigeration unit to be used, and that lower chilling temperatures can be obtained.

I claim:

1. Chilling apparatus for chilling a flow of water comprising a tank for containing water, refrigeration means including a helical refrigerant evaporator coil disposed within the tank in spaced relation to the internal surface of the tank for forming a tube of ice in the tank, a water inlet means and a water outlet means in the tank, the water inlet means directing a flow of water from the inlet means in a helical path through the tube of ice and in direct contact with the ice thereby to chill the water, and a sensor disposed within the offset from the axis of the tube and coupled to said refrigeration means, said sensor being operative to stop operation of the refrigeration means in the event that the sensor detects ice in its immediate vicinity, and said sensor being disposed radially outwardly of the water inlet.

2. Chilling apparatus as claimed in claim 1, wherein the water inlet means comprises a nozzle disposed at one end of the tube of ice which nozzle is offset from the lengthwise axis of the tube of ice and faces into the tube in a direction skewed with respect to the lengthwise axis of the tube.

3. Chilling apparatus as claimed in claim 1 further comprising a helically formed guide element within the tube of ice for directing the flow of water in a helical path through the tube of ice.

4. Chilling apparatus as claimed in claim 1 further comprising a series of helically inclined vanes for directing the flow of water in a helical path through the tube of ice.

5. Chilling apparatus as claimed in claim 1 further comprising a second sensor disposed within and offset from the axis of the tube a lesser distance than said first sensor and coupled to said ice forming means to actuate said ice forming means when contacted by the ice to stop the formation of ice.

6. Chilling apparatus as claimed in claim 1, wherein the tank is a sealed tank provided with said water inlet and said water outlet.

7. A method of chilling a flow of water comprising forming a tubular bank of ice on a helical evaporator tube of a refrigeration unit which tube is disposed within a sealed tank in spaced relation to the internal surfaces of the tank, directing the flow of water into the sealed tank in a helical path through the tubular bank of ice and tapping the chilled water from the tank.

* * * * *